United States Patent
Smith

(10) Patent No.: US 7,397,421 B2
(45) Date of Patent: Jul. 8, 2008

(54) METHOD FOR DETECTING ACOUSTIC EMISSION USING A MICROWAVE DOPPLER RADAR DETECTOR

(76) Inventor: Gregory C. Smith, 5111 Schubert St., Ames, IA (US) 50014

( * ) Notice: Subject to any disclaimer, the term of this patent is extended or adjusted under 35 U.S.C. 154(b) by 350 days.

(21) Appl. No.: 11/112,569

(22) Filed: Apr. 22, 2005

(65) Prior Publication Data

US 2005/0265124 A1 Dec. 1, 2005

Related U.S. Application Data

(60) Provisional application No. 60/564,427, filed on Apr. 22, 2004.

(51) Int. Cl.
*G01S 13/88* (2006.01)
*G01N 29/00* (2006.01)
(52) U.S. Cl. .................. 342/192; 73/587; 340/679
(58) Field of Classification Search ............ 342/28, 342/114, 173, 192; 73/587; 340/679, 683
See application file for complete search history.

(56) References Cited

U.S. PATENT DOCUMENTS

| 4,658,245 | A * | 4/1987 | Dye et al. | 340/683 |
| 6,612,172 | B2 * | 9/2003 | Cadet et al. | 73/587 |

FOREIGN PATENT DOCUMENTS

WO WO 01/73389 A1 10/2001

OTHER PUBLICATIONS

Albanese, R. A., Banks, H. T., & Raye, J. K. (2002). Nondestructive evaluation of materials using pulsed microwave interrogating signals and acoustic wave induced reflections. Inverse Problems, 18, 1935-1958.

ASTM (1990). Standard terminology relating to acoustic emission. In 1990 Annual Book of ASTM Standards (vol. 3.03, pp. 269-271). Philadelphia: ASTM.

ASTM (1998). Standard guide for determining the reproducibility of acoustic emission sensor response. In 1996 Annual Book of ASTM Standards (vol. 3.03, pp. 386-391). Philadelphia: ASTM.

Barton, J., & Reuben, B. (1996). Tool wear monitoring by optical techniques. Materials World, 4(3), 131-132.

Brown, E. R, Reuben, R. L., Neill, G. D., & Steel, J. A. (1999). Acoustic emission source discrimination using a piezopolymer based sensor. Materials Evaluation, 57(5), 515-520.

(Continued)

*Primary Examiner*—Ian J Lobo
(74) *Attorney, Agent, or Firm*—Simmons Perrine PLC

(57) ABSTRACT

Acoustic emissions are detected by reflecting microwave radar signals off of an object, receiving reflected radar signals, generating an intermediate frequency, and filtering the intermediate frequency to remove low frequency signals associated with object movement and not acoustic emissions. A microwave Doppler radar detector provides the signals, a band-pass filter filters the intermediate frequency signal, and resulting signal is collected and analyzed to establish a relationship between the acoustic emission and the filtered signal. One application described is detecting tool wear using a microwave Doppler-based acoustic emission sensor and predicting tool wear based on the detected acoustic emission.

11 Claims, 7 Drawing Sheets

OTHER PUBLICATIONS

Bulst, W-E., Fischerauer G., & Reindl L. (2001). State of the art in wireless sensing with surface acoustic waves. IEEE Transactions on Industrial Electronics, 48(2), 266-271.

Chi, L. A., & Dornfield, D. A. (1998). A self-organizing approach to the detection and prediction of tool wear. ISA Transactions, 37, 239-255.

Drouillard, T. F. (1998). A history of acoustic emission. Journal of Acoustic Emission, 14(1), 1-34.

Dunegan, H., & Harris, D. (1969). Acoustic emission—a new non-destructive testing tool. Ultrasonics, 7(3), 160-166.

Govekar, E., Gradisek, J., & Grabec, I. (2000). Analysis of acoustic emission signals and monitoring of machining processes. Ultrasonics, 38, 598-603.

Imai, S., Burger, G. J., Lammerink, T. S. J., & Fluitman, J. H. J. (1997). Output characteristics of a thin-film piezoelectric AE sensor for magnetic head-disk interaction. JSME International Journal, Series C, 40(1), 33-41.

Kawai, H. (1969). The piezoelectricity of polyvinylidene fluoride. Japanese Journal of Applied Physics, 8, 975-976.

Li, X. (2002). A brief review: acoustic emission method for tool wear monitoring during turning. International Journal of Machine Tools and Manufacture, 42, 157-165.

McBride, R., Barolan, T. A., Barton, J. S., Wilcox, S. J., Borthwick, W. K. D., & Jones, J. D. C. (1993). Detection of acoustic emission in cutting processes by fibre optic interferometry. Measurement Science and Technology, 4(10), 1122-1128.

Microwave Solutions (2002). Small PCB Style—MDU1620. Retrieved May 23, 2002, from http://www.microwave-solutions.com.

Microwave Solutions, Ltd., Using the Microwave Solutions Ltd. Motion Detector Unit, p. 1-6 (Oct. 30, 2000) available at http://www.microwave-solutions.com/apps.htm.

Millman, J., & Halkias, C. C. (1972). Integrated electronics: analog and digital circuits and systems. New York: Mc-Graw Hill.

PCB Piezotronics (1999). Model 353B03. Retrieved Jul. 1, 2003 from http://www.pcb.com.

PCB Piezotronics (2003). PCB Piezotronics. Retrieved Jul. 1, 2003 from http://www.pcb.com.

Quan, Y., Zhou, M., & Luo, Z. (1998). On-line robust identification of tool-wear via multi-sensor neural-network fusion. Engineering Applications of Artificial Intelligence, 11, 717-722.

Schoess, J. N., & Zook, J. D. (1998). Test results of resonant microbeam sensor (RIMS) for acoustic emission monitoring. Journal of Intelligent Material Systems and Structures, 9(11), 947-951.

Sick, B. (2002). Fusion of hard and soft computing techniques in indirect, online tool wear monitoring. IEEE Transactions of Systems, Man, and Cybernetics, 32(2), 80-91.

Spedding, N. B. (1996). The effect of sensor geometry on the use of polyvinylidene fluoride as an acoustic emission sensor. Insight: Non-Destructive Testing and Condition Monitoring, 38(1). 37-40, 50.

Steindel, R., Pohl, A., Reindl, L., Hornsteiner, J., Riha, E., Seifert, F. (1969). Passive surface acoustic wave sensors for temperature and other measurands, Proceedings TEMPMEKO, pp. 424-429.

Stiffler, R., & Henneke, E. G. (1983). The application of polyvinylidene fluoride as an acoustic emission transducer for fibrous composite materials. Materials Evaluation, 41(8), 956-960.

Sundaresan, M. J., Ghoshal, A., & Schulz, M. J. (2002). A continuous sensor for damage detection in bars. Smart Materials and Structures, 11, 475-488.

Swanson, D. C. (2000). Signal Processing for Intelligent Sensor Systems. New York: Marcel Dekker, pp. 7-10.

Smith, G. C., & Lee, S. S (2005). A method for detecting tool wear on a CNC lathe using a Doppler Radar Detector. International Journal of Advanced Manufacturing Technology, 25(3-4), 270-280.

* cited by examiner

Electronic filter frequency response

Radar detector output signal (Experiment 1, Trial 7)

Accelerometer output signal (Experiment 1, Trial 7)

Radar detector power spectrum (Experiment 1, Trial 7)

Accelerometer power spectrum (Experiment 1, Trial 7)

Radar detector output signal (Experiment 2, Trial 6)

Accelerometer output signal (Experiment 2, Trial 6)

Radar detector power spectrum (Experiment 2, Trial 6)

Accelerometer power spectrum (Experiment 2, Trial 6)

METHOD FOR DETECTING ACOUSTIC EMISSION USING A MICROWAVE DOPPLER RADAR DETECTOR

CROSS-REFERENCE TO RELATED APPLICATIONS

This application is based upon and claims the benefit of priority from Applicant's prior provisional patent application, application U.S. Ser. No. 60/564,427, filed Apr. 22, 2004, the entire contents of which are incorporated herein by reference.

BACKGROUND OF THE INVENTION

The present invention relates to acoustic emission. More particularly, the present invention relates to detecting acoustic emissions using a microwave Doppler radar detector.

1. Acoustic Emission

ASTM E 610-89a (1990) defines acoustic emission (AE) as "the class of phenomena whereby transient elastic waves are generated by the rapid release of energy from a localized source or sources within a material, or the transient elastic waves so generated" (p. 269). Li (2002) states that, "Clearly, an AE is a sound wave or, more properly, a stress wave that travels through a material as the result of some sudden release of strain energy" (p. 157).

Investigators have developed many acoustic emission (AE) instruments and systems for both monitoring and nondestructively testing structures, materials, manufacturing processes, and devices. AE has been used for nondestructively testing refineries, pipe-lines, power generators (nuclear or other), aircraft, offshore oil platforms, paper mills, and structures (bridges, cranes, etc.). AE sensors have also been used for quality control in manufacturing operations and in research applications, involving composite structures such as fiberglass, reinforced plastics, and advanced aerospace materials (Li, 2002).

AE is also generally rated one of the most effective indirect methods for monitoring tool condition in machining operations. The major advantages of using AE to monitor tool condition are that (1) the frequency range of the AE signal is much higher than that of the machine vibrations and environmental noises, and (2) AE measurements do not interrupt cutting operations (Li, 2002).

As shown in FIG. 1, possible sources of AE during metal-cutting processes include:
1. Plastic deformation in the workpiece during the cutting process;
2. Plastic deformation in the chip;
3. Frictional contact between the tool flank face and the workpiece, resulting in flank wear;
4. Frictional contact between the tool rake face and the chip, resulting in crater wear;
5. Collisions between chip and tool;
6. Chip breakage;
7. Tool fracture.

Based upon analysis of AE signal sources during machining, AE consists of both continuous and transient signals, which have distinctly different characteristics. Continuous signals are associated with shearing in the primary zone and wear on the tool rake and flank faces. Burst or transient signals result from either tool fracture or chip breakage. Friction between workpiece and tool and tool fracture are regarded as the most important sources of continuous and transient AE signals in turning operations (Li, 2002).

2. Early AE Sensors

In 1996, Drouillard provided a comprehensive history of early acoustic emission research. Relevant highlights from his article follow.

In the early 1900s, metalworkers often reported audible sounds (clicking, chatter; squeaks, grinding, hissing, and snapping) emitted by metals, particularly tin and zinc, during twinning and martensitic transformation. Soon thereafter, several investigators conducted instrumented experiments to study the phenomenon (Drouillard, 1996).

From 1925-1929, Klassen-Neklyudova (National Physical-Technical Rontgen Institute in Leningrad, Russia) began a systematic investigation into the very regular cracking noises emitted during plastic deformation of metals. She used an optical method to measure stepwise, jerky movements of a metal specimen during plastic deformation and then correlated the measurements with the cracking noises (Drouillard, 1996).

On Nov. 21, 1933, at a meeting of the Earthquake Research Institute in Tokyo, Professor Fuyuhiko Kishinouye presented the first report on a scientifically planned acoustic emission experiment. Kishinouye studied AE characteristics in wood to understand and develop methods for studying fracture of the earth's crust, which leads to earthquakes. He used a phonograph pick-up with a steel needle to measure stress waves in a wooden board which he bent to fracture. He reported that when the board cracked, an electric current was generated in the coil of the pick-up, which he then amplified and used to drive a seismograph. Kishinouye reported that the instrument recorded both audible and inaudible vibrations during both the bending process and final fracture (Drouillard, 1996).

From 1936-1940, Forster and Scheil (Kaiser-Wilhelm-Institut fur Metallforschung, Stuttgart, Germany) conducted several AE experiments. They developed an electrodynamic transmitter/receiver system to transform mechanical vibrations and acoustic emissions into electrical voltages which could be amplified and recorded. They used the device to measure extremely small voltage changes due to resistance variations produced by sudden, jerky strain movements caused by martensitic transformations in wire-shaped nickel-steel test specimens (Drouillard, 1996).

In 1948, Mason, McSkimin, and Schockley (Bell Telephone Laboratories, Murray Hill, N.J.) reported using a quartz crystal transducer, pressed directly against a tin specimen, to measure acoustic emission. They applied enough stress to deform the specimen and cause twinning dislocations, which, in turn, produced acoustic emission. The quartz crystal they used had a uniform sensitivity from a few kilohertz to 5 MHz (Drouillard, 1996).

In the early 1960s, a special projects team of structural test engineers, led by Allen T. Green (Aerojet-General Corporation, Sacramento, Calif.), used AE measurements to verify the structural integrity of glass-filament-wound Polaris solid rocket motor cases fabricated for the U.S. Navy. They noticed that hydrostatic proof-pressure tests caused audible sounds in the test specimen. The team used microphones, a magnetic tape recorder, and sound-level analysis equipment to detect, record, and then post-test analyze the acoustic signals. Later, they used accelerometers and charge amplifiers to improve their detection capability. In 1965, the team used the method to locate crack initiation and propagation prior to catastrophic failure, at about 56 percent proof pressure, in a steel solid rocket motor case. Their multi-channel analog computer-based system was used to build the first commercial, real-time structural testing system (Drouillard, 1996).

In 1963, Harold Dunegan (Lawrence Livermore National Laboratory, Livermore, Calif.) began a lifelong career in AE, after hearing a paper presentation at the Third Symposium on Physics and Non-Destructive Testing. With co-workers, Dunegan developed practical AE procedures to predict failure in pressure vessels during proof testing, without taking the vessels to failure. He also developed the S140 transducer, which became the workhorse of the AE industry for over 25 years. Dunegan contributed significantly to AE study by developing more effective instrumentation, which eliminated noise due to mechanical vibration of the test specimen. In particular, he developed narrow-banded piezoceramic sensors which operated in frequency ranges well above the audio range (30-150 kHz). (Drouillard, 1996; Dunegan & Harris, 1969).

In the late 1960s, the U.S. Atomic Energy Commission began using AE techniques for nondestructive nuclear reactor testing. They used existing AE sensors, including accelerometers with charge amplifiers and tape recorders, and developed a new high-temperature submersible microphone for use in the liquid sodium environment of a reactor (Drouillard, 1996).

During the late 1960s and early 1970s the Boeing Company (Seattle, Wash.) initiated research on incipient failure detection in bearings, signature analysis from rotating machinery, leak detection in hydraulic systems, and cavitation and erosion detection in fluid flow valves. They also studied crack growth in titanium (Drouillard, 1996).

From 1967-1980, strong AE research helped determine the source of AE and improved methods for detecting crack growth in nuclear reactor pressure vessels and other thick-walled vessels. AE research efforts during the period led to development and commercialization of AE source location instrumentation and software. In 1968, Nortec Corporation (Richland, Wash.) manufactured a plug-in module for the Tektronix oscilloscope. Later that year, Dunegan founded Dunegan Research Corporation (Livermore, Calif.) to supply the first full line of AE sensors and modular instruments. Other U.S. companies also entered the market: Trodyne (Teterboro, N.J., 1970), Acoustic Emission Technology (Sacramento, Calif., 1972), and Physical Acoustics (Princeton, N.J., 1978) (Drouillard, 1996).

From 1980-1996, decline in heavy industry, decline in the use of nuclear reactors for power generation, and the end of the Cold War and break-up of the Soviet Union (and, thus, less defense spending) slowed AE research and instrumentation development, in some areas. In other areas, however, AE activity grew. Fowler (Monsanto Company, St. Louis, Mo., 1984) developed an AE inspection program that virtually eliminated catastrophic failures in fiber reinforced plastic vessels and piping. A number of AE studies related to tool wear and cutting processes, machine monitoring, bearing friction, and friction in rotating members were reported. Deterioration of many concrete bridges around the world led to increased AE research related to monitoring concrete and civil structures. According to Drouillard, in 1996, the U.S. Department of Transportation rated one in three U.S. bridges either structurally deficient (unable to support standard loads) or functionally obsolete. Seismology studies, for earthquake detection and mine failure prediction, mirrored studies of AE in metals and other materials, since rocks and metals under stress produce similar acoustic emission events. During the period, research related to AE in wood and AE methods for inspecting wood and wood products for defects, cracks, or pests also increased (Drouillard, 1996).

From 1980-1996, several new AE sensor or signal processing techniques were developed. Rockwell International and the National Bureau of Standards developed capacitive transducers to detect burst-type AE. (Drouillard, 1996). At the Virginia Polytechnic Institute, Stiffler and Henneke (1983) designed and tested AE sensors made from polyvinylidene fluoride (PVDF), a piezoelectric polymer which was originally discovered by Kawai (1969). Other investigators introduced digitizers and computers to capture, process, and analyze AE signals (Drouillard, 1996).

3. Recent AE Sensors

During the time period since Drouillard's review (1996-2002), studies related to developing new AE sensor technologies have focused primarily on new piezoelectric sensor materials or new sensor geometries.

Spedding (1996) explored the effects of geometry on thin-film polyvinylidene fluoride (PVDF) AE sensors. He showed that sensor geometry significantly affects sensor frequency response. His results show that thin-film PVDF could be used for developing frequency-selective, directionally sensitive, or programmable sensors.

Imai et al. (1997) developed a compact thin-film AE sensor for detecting head-disk interaction in magnetic disk devices. They used micromachining techniques to embed the sensor inside the slider, by sputtering a zinc oxide (ZnO) piezoelectric layer between two electrodes formed by electron beam deposition. Using both simulations and experiments, they showed that an embedded thin-film sensor is a viable alternative to conventional lead zirconate titanate (PZT) piezoceramic AE sensors for detecting head-disk interaction.

Brown et al. (1999) developed a piezoelectric sensor using a copolymer composed of polyvinylidene fluoride and triflouroethylene (PVDF/PTrFE). They experimentally compared their sensor to a commercial PZT piezoceramic sensor and a laser interferometer using pencil lead fracture and helium jet AE tests. They also evaluated their sensor, in field tests, for detecting fluid and mechanically generated acoustic emission in a centrifugal pump and a turbocharged diesel engine. Brown et al. concluded that a copolymer piezoelectric AE sensor can be used as a viable alternative to piezoceramic sensors or laser interferometers, while providing a more broad-band and detailed response than resonant piezoceramic sensors.

Sundaresan et al. (2002) developed a continuous or distributed AE sensor composed of PZT piezoceramic fibers suspended in a flexible epoxy matrix. They showed that using a continuous sensor could be more efficient for monitoring large areas on complex structures (e.g., for in-flight aircraft structural health monitoring) than using several conventional AE sensors; a continuous sensor is easier to mount and only requires a single data collection channel for a single sensor strip.

Schoess and Zook (1998) introduced a fundamentally new contact AE sensing technique. They used Honeywell's resonant microbeam MEMS sensor to experimentally show that the frequency of a resonating microbeam mounted in a silicon substrate varies in response to simulated AE events (ultrasonic pulsers and pencil lead fracture tests) applied to the silicon substrate. They believe the sensor shows promise for structural and machinery diagnostic applications.

4. AE Sensors for Tool Condition Monitoring

Most early research studies related to tool condition monitoring during machining operations used piezoceramic or piezoelectric sensors for acoustic emission detection (McBride et al., 1993). Piezoceramic sensors produce a dynamic voltage in response to stress waves, when a static electric field is applied to the sensor material. Piezoelectric sensors use materials which are naturally polarized (or which are polarized during manufacturing processes) to reduce the magnitude of the static electric field needed to bias the sensor (Swanson, 2000).

For tool-wear monitoring, placing a piezoceramic or piezoelectric sensor in contact with the workpiece or cutting tool causes stress (sound) waves traveling through the workpiece or tool to also travel through the sensor. As a result, the sensor generates electrical voltages proportional to the stress waves.

The piezoceramic or piezoelectric transducer must have good acoustic coupling to the source of AE. Often, however, mounting a piezoceramic or piezoelectric sensor in contact with the workpiece interferes with machining operations. As a result, the sensor often needs to be placed in contact with parts of the machining bed or tool holder, which attenuates the AE signals, modifies their spectral and temporal properties, and introduces noise from other sources in the machine (e.g., spindle bearing noise and slideway movement) (McBride et al., 1993).

Piezoceramic materials also give rise to strong mechanical resonances, which results in high sensitivity in only a few narrow frequency bands within the spectrum of interest. Although sensors with narrow sensitivity bands effectively eliminate low-frequency machine noise, they also may miss significant AE events outside their limited sensitivity ranges. The precise electromechanical properties of piezoceramic and piezoelectric transducers also vary from unit to unit. As a result, users must individually calibrate devices. Even with calibration, results strongly depend on the quality of the mechanical coupling between sensor and sensed surface, which, in practice, varies greatly (McBride et al., 1993).

Due to the limitations of piezoceramic and piezoelectric AE sensors, McBride, et al., (1993) developed a technique for detecting tool wear based on laser interferometry. They used a laser light source and fiber optics to produce a miniature and robust probe for detecting acoustic emission by measuring the small amplitude (~0.1 nm), high frequency (0.1-1 MHz) surface vibrations produced during machining operations. They also demonstrated the technique for probing both the workpiece and the rotating tool holder during face milling of mild steel.

Barton and Reuben (1996) also used laser interferometry to measure both acoustic emission (AE) and surface finish (SF) for monitoring tool insert condition. Their AE and SF sensors used an optical fiber to connect a probe head near the workpiece to optical and detection systems remote from the machining center.

AE sensors for tool condition monitoring, based upon laser interferometry, place a small fiber optic probe approximately 20 mm from a plane end face of the workpiece. Laser light sent through the fiber optic cable reflects off of the face of the workpiece. Reflected light interferes with incoming light, based upon distance from the probe to the workpiece face. Signal processing techniques can be used to determine the instantaneous distance from the probe to the workpiece, based upon measured interference patterns, and, thus, determine characteristics of the stress (sound) waves traveling through the workpiece. Laser interferometer measurements can detect target displacements of less than 1 nm (Barton & Reuben, 1996).

Interferometry offers a highly sensitive method for measuring displacement or vibration that can achieve more accurate acoustic emission measurements than contacting piezoelectric transducers located on the machine bed. Interferometry can also be used for accurate non-contact surface finish (SF) measurement in machining operations (Barton & Reuben, 1996).

According to Barton and Reuben (1996), the greatest advantage of optical AE and SF measurement techniques are that they are non-contacting, with no mechanical loading of the test surface. As a result, optical AE measurement techniques guarantee reproducibility of coupling between the transducer and the measured surface. Optical SF measurement techniques also eliminate the possibility of damaging soft surfaces during measurement. In addition, output signals from interferometry are directly traceable to the light wavelength used and are, therefore, absolutely calibrated.

Limitations of AE sensors using laser interferometry include: high cost, small distance required between probe and workpiece, limitations of workpiece geometry (for proper laser light reflection), appearance and routing of the fiber-optic cable, interference with tool movement, and signal contamination due to coolant fluids and other contaminants In more recent tool condition monitoring research, investigators have pursued a multi-sensor approach, combining piezoceramic, piezoelectric, or optical AE sensors with other types of sensors, to improve tool condition monitoring accuracy over single-sensor methods.

Chi and Dornfield (1998) combined both piezoceramic acoustic emission and cutting force sensors, with an expert system using decision trees and group method data handling, to improve tool wear estimation and prediction accuracy (to within 5% of measured values) over a model created using stepwise regression analysis.

Quan, et al. (1998) also used a multi-sensor approach, by combining an acoustic emission sensor and a Hall-effect power sensor, to detect tool wear with 96% accuracy and calculate actual tool wear with 90% accuracy. They concluded that using a multi-sensor approach, with a neural network to evaluate the multi-sensor data, improves tool wear detection accuracy over a single-sensor method under complex and changing machining conditions.

In 2002, Sick reviewed 138 prior publications related to tool wear monitoring in turning operations. At that time, Sick still rated even the most promising tool wear monitoring methods not marketable due to lack of precision and insufficient generalization capability (operation restricted to a single machine tool, to a specific combination of work material and tool coating, or a small range of cutting conditions).

From Sick's (2002) review, tool wear monitoring remains a difficult problem yet to be solved. From the research to date, machining processes have been classified as non-linear time-variant systems, which are difficult to model. In addition, sensor limitations have made machining processes difficult to measure.

Prior AE studies, particularly studies related to tool condition monitoring in machining operations, have led to two primary types of AE sensors: piezoceramic or piezoelectric crystals and laser interferometry systems.

For tool condition monitoring, piezoceramic and piezoelectric sensors exhibit severe limitations. To operate properly, they must be in contact with an object through which the acoustic waves are traveling. Investigators cannot practically install sensors on the tool or workpiece. Thus, they usually place sensors on the machining bed or tool holder. Sensor placement away from the workpiece leads to signal attenuation, modified spectral and temporal properties, and added noise from other sources in the machine (e.g., spindle bearing noise and slideway movement).

Piezoceramic materials also give rise to strong mechanical resonances, which can result in adequate sensor sensitivity in only a few narrow frequency bands within the spectrum of interest. The precise electromechanical properties of such transducers also vary from unit to unit, so that users must individually calibrate sensors. Even with calibration, results depend strongly on the quality of the mechanical coupling between transducer and surface, which, in practice, varies greatly.

AE sensors based upon laser interferometry also suffer from severe limitations. They require a small distance between sensor probe and workpiece. As a result, users may find it difficult to precisely mount the sensor probe and route the sensor's fiber-optic cable. In addition, the sensor and cable may interfere with tool movement during machining operations and detract from machine appearance. Laser interferometry-based sensors also suffer from signal contamination due to coolant fluids and other optical contaminants. In addition, laser systems are typically expensive.

Therefore, it should be appreciated that the prior art discloses numerous examples of AE sensors which have problems or disadvantages in particular applications.

Although seemingly unrelated without having the benefit of the present disclosure, the use of microwave Doppler radar detectors are now discussed. A microwave Doppler radar detector is designed to "sense" object motion using the Doppler shift phenomenon. The detector emits a high-frequency electromagnetic signal. If the signal reflects off of an object moving toward or away from the sensor, the transmitted signal increases or decreases in frequency, with respect to the original transmitted signal frequency. A receiver in the Doppler radar detector captures the reflected signal, compares the transmitted and received frequencies, and produces an IF (intermediate frequency) output signal with frequency proportional to the velocity of the moving object. IF output signal amplitude varies as a complex function of the size and reflectivity of the sensed object and the object's distance from the sensor (Microwave Solutions, 2002).

Microwave Doppler radar has been used in many practical applications, such as law enforcement systems for detecting automobile speed and commercial systems for opening doors as customers approach department stores. However, to the inventor's knowledge, microwave Doppler radar has never been used to directly detect acoustic emission.

Surface acoustic wave (SAW) devices, based upon microwave radar technology, have been used, for many years, to create many different non-contact wireless sensors (Bulst et al., 2001):

1. Temperature sensors (radio-requestable clinical thermometers; temperature sensors on rotating turbine blades, train brakes, centrifuges, and tires; temperature sensors in hot, dangerous, or inaccessible process chambers)
2. Pressure sensors
3. Torque sensors (tap drill torque alarm)
4. Current sensors
5. Chemical sensors
6. Humidity sensors
7. Mechatronic applications The SAW approach uses a microwave radar signal to interrogate a sensor composed of a microwave antenna etched on a material substrate which responds to a given physical condition in a known manner (Steindel, et al., 1999). The antenna converts the interrogating radar signal into a surface acoustic wave which propagates along the substrate and reflects off of metal strips etched on the surface of the substrate at known distances from the antenna. The acoustic wave reflections return to the antenna and transform back into microwave signals which then transmit substrate condition information to a remote receiver.

As the SAW sensor substrate contracts, elongates, or bends in response to surrounding physical conditions, returned signal characteristics change. Users can then determine physical conditions affecting the substrate by processing and analyzing returned signal characteristics. Using different substrate materials creates sensors which can be used to measure different physical environmental properties.

Tyren (2001), in an international patent application (WO 01/73389 A1), describes a non-contact method for measuring mechanical properties such as torque, force, or pressure. The described method uses a vibrating string element to sense changes in the measured quantity and a microwave interrogating signal. Variations in the measured quantity change the tension in the vibrating string, and thus change the vibration frequency of the string element. Changes in vibration frequency of the string element change the amplitude of the microwave interrogating signal.

According to the patent application, "a microwave signal can be amplitude modulated by a mechanically oscillating object in the signal path between a transmitter and receiver" (Tyren, 2001, p. 1). The patent application also describes experiments conducted to verify the phenomenon, using an approximately 10 cm long guitar string segment, in oscillation at 150 Hz, to amplitude modulate a 1.3 GHz microwave signal.

By changing the oscillation frequency of the guitar string to 230 Hz, the inventor measured a change in microwave signal amplitude modulation that followed the change in frequency.

The patent application further describes several possible applications for the phenomenon, including a method for measuring the torque in a rotating axle. The method uses a string element placed along a main tension line of the axle. A mounting mechanism holds the string away from the surface of the axle, so that the string can oscillate freely. Natural system vibrations, or a clapper, induce string vibration. As torque in the axle changes, the oscillation frequency of the string also changes. Again, a high-frequency electromagnetic signal source radiates the vibrating string. Variations in the amplitude of the reflected high-frequency signal indicate variations in torque within the rotating axle. Tyren reportedly used a microwave Doppler radar detector and a band-pass filter tuned to the vibration frequency of a metal guitar string to detect changes in torque due to cutting operations on a manual lathe.

In an earlier study, the inventor worked with Tyren to evaluate his sensor design for detecting changes in torque due to cutting operations on a CNC lathe. Tyren supplied a hand-made microwave radar detector and a band-pass filter needed to detect a vibrating guitar string. The hand-made microwave radar system did not work. As a result, Tyren recommended using an MDU 1620 Motion Detector Unit from Microwave Solutions (http://www.microwave-solutions.com) as a microwave radar source and described the characteristics of a band-pass filter needed to detect a vibrating guitar string. The inventor designed a circuit composed of the Microwave Solutions Motion Detector Unit and a band-pass filter to meet Tyren's specifications for detecting a vibrating guitar string. In testing, the circuit did not appear to work well for detecting torque changes due to cutting operations on a CNC lathe, because workpiece and lathe spindle motion created radar detector signals that were much greater in magnitude than the signals created by a vibrating guitar string attached to the rotating workpiece.

Therefore, it is a primary object, feature, or advantage of the present invention to improve upon the state of the art.

It is a further object, feature, or advantage of the present invention to overcome the limitations of current piezoceramic, piezoelectric and laser-interferometry AE sensors.

Another object, feature, or advantage of the present invention is to provide a method and apparatus for an AE sensor which is economical, yet accurate.

Yet another object, feature, or advantage of the present invention is to provide an AE sensor appropriate for tool condition monitoring in machining operations as well as other applications.

These and/or other objects, features, or advantages of the present invention will become apparent from the specification and claims that follow.

SUMMARY OF THE INVENTION

The present invention provides a method of detecting acoustic emissions by detecting acoustic emissions using a microwave Doppler radar detector. The present invention can be used in numerous applications, including detection of tool wear. In such an application, tool wear can be detected during on-line machining operations.

The general mechanism for using the preferred embodiment of the microwave Doppler radar-based acoustic emission sensing detection method of the present invention for tool wear detection involves first flooding the cutting area of a machining center with a microwave radar signal from the transmitter in a Doppler radar detector. Radar reflections from the tool and/or workpiece are received by a receiver in the Doppler radar detector. The Doppler radar detector generates an intermediate frequency ("IF") signal. The IF signal generated by the receiver in the Doppler radar detector is then filtered to remove low frequency signals of less than 1 kHz. The resulting filtered signal is measured. Next, a regression relationship is established between tool wear and the amplitude or frequency of the detected radar reflections. Using the established regression relationship, tool wear can be predicted during on-line machining operations.

The present invention is based upon the known ability of a Doppler radar detector to detect object motions and generate an IF output signal with frequency proportional to the velocity of the moving object and signal amplitude which varies as a complex function of the size and reflectivity of the sensed object and the object's distance from the sensor (Microwave Solutions, 2002). In addition, the method is based upon the theoretical finding of Albanese, et al. (2002) that high-frequency electromagnetic waves can reflect not only from moving objects, but also from traveling acoustic waves in dielectric materials. Further, the methodology of the present invention depends upon prior evidence that metal cutting generates acoustic waves in both the workpiece and tool during machining operations.

According to the present invention, microwave Doppler radar can be used to remotely detect acoustic waves in both the workpiece and the tool in machining operations. Further, the inventor believes that the acoustic waves will change, characteristically, as the tools used for cutting wear. As a a result, the IF signals generated by the Doppler radar detector will also change in character (e.g., signal amplitude).

DETAILED DESCRIPTION OF THE PREFERRED EMBODIMENT

Figure 1:
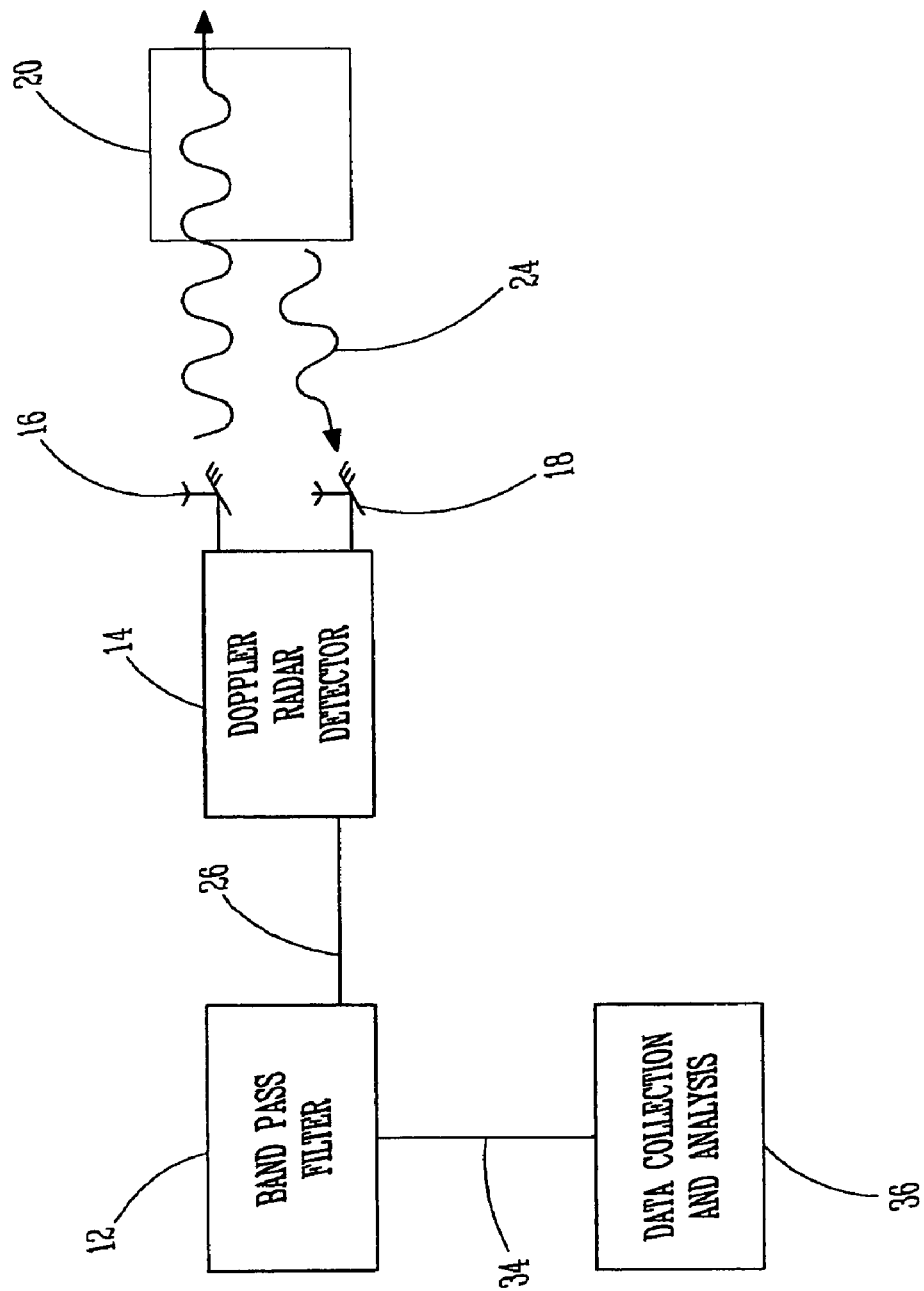
FIG. 1 is a block diagram of the preferred embodiment of the present invention.
Figure 2:
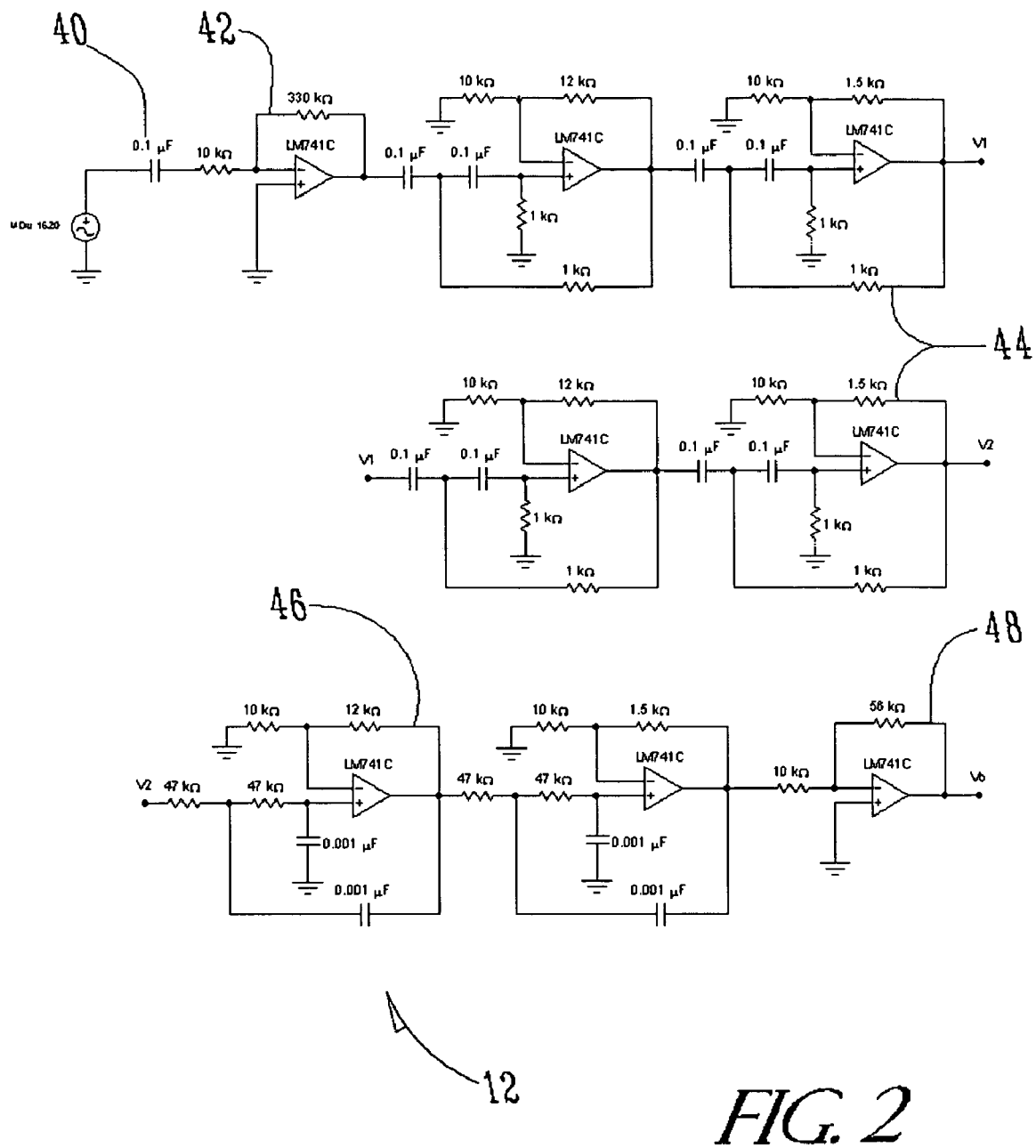
FIG. 2 is an electronic schematic of a high frequency band-pass filter of the preferred embodiment.

The general arrangement of components of the preferred embodiment of the method of the present invention is shown in FIG. 1. The method of the preferred embodiment builds on the previous knowledge of AE detection by adding a high frequency band-pass filter 12 onto a Doppler radar detector 14. The Doppler radar detector 14 is already known in the art and has a microwave transmitter 16 and a microwave receiver 18. The microwave transmitter 16 floods an area 20 with microwave radar signals 22. The microwave radar signals 22 reflect off any objects (not shown) in area 20. These reflected radar signals 24 are received by microwave receiver 18. The Doppler radar detector 14, as is known in the art, generates an intermediate frequency ("IF") signal 26. This IF signal 26 is the difference between the transmitted microwave radar signal 22 and the reflected radar signal 24. The band-pass filter 12 filters out lower frequency signals (not shown) in the IF signals 26 to produce a filtered IF signal 34. The lower frequency signals are associated with mechanical movement and not acoustic emissions. In the preferred embodiment the band-pass filter 12 also removes frequencies less than 1 kHz. The band-pass filter 12 also amplifies signals corresponding to AE. When sampling IF signals 26 to a computer (one preferred embodiment of the data collection and analysis 36) for subsequent digital processing, the band-pass filter 12 also removes very high frequencies necessary to prevent aliasing. This filtered IF signal 34 is ready for data collection and analysis 36, serving as a measuring of the filtered IF signal.

After completing the study with Tyren and in later independent experiments, the inventor experimentally discovered that, by using a higher frequency band-pass filter 12, a microwave radar detector 14 can directly detect acoustic emission events caused by two pieces of metal striking against each other. Albanese, et al. (2002) also theoretically demonstrated that high-frequency electromagnetic waves can reflect directly from traveling acoustic waves in dielectric materials. Although microwave radar signals 22 may interact differently with dielectric and metallic material, based upon the investigator's experimental discovery and Albanese et al.'s theoretical finding, the inventor has determined that microwave Doppler radar could be used to directly detect acoustic waves in a metal workpiece (not shown but in area 20) during machining and, thus, eliminates the need for a special-purpose SAW sensor, or a sensor based upon a vibrating string element.

Microwave radar waves may reflect directly from traveling acoustic waves in both dielectric and metallic objects. On the other hand, microwave radar waves may detect small ultrasonic vibrations in a metallic object, resulting from AE producing stress events. In either case, with proper post-filtering using the high-frequency band-pass filter 14, the microwave Doppler radar detector 14 can be used as a non-contact sensor for measuring AE in the workpiece directly during machining, and, thus, is used to monitor tool condition.

Several characteristics make the microwave Doppler radar detector 14 attractive for direct AE detection, in general, and for machine tool condition monitoring. The Doppler radar detector 14 is inexpensive when compared to lasers used by the prior art or SAW sensors. No contact between is necessary with the area 20 to be detected. The sensing distance is as far as 1.5 feet for the known Doppler radar detector 14 or farther with better detectors. The Doppler radar detector is simple to mount. Finally, the signal processing methods for Doppler radar signals including but not limited to A/D conversion and signal amplitude measurements are simple and well understood in the art.

To test the research hypothesis that the microwave Doppler radar detector 14 can directly detect acoustic emission in an aluminum test specimen, the inventor completed two experiments. In the first experiment, the microwave Doppler radar detector 14 and a prior art accelerometer were used to detect acoustic emission events caused by tapping a CNC machine tool insert against an aluminum test specimen. In the second experiment, a microwave Doppler radar detector and an accelerometer were used to detect acoustic emission events caused by breaking a pencil lead against an aluminum test specimen.

Experiment 1

The first experimental setup and methodology showed that a microwave Doppler radar detector, with appropriate filtering, can be used to directly detect acoustic emission events caused by tapping a CNC machine tool insert against an aluminum test specimen. The microwave Doppler radar detector 14 and the band-filter 12 were arranged as shown in FIG. 1 for detecting acoustic emission in the 1-5 kHz frequency range. The band-pass filter 12 of the first experiment was designed to prevent aliasing due to signal sampling and remove low-frequency IF output due to object motion from investigator movement or large-scale mechanical movement. A test specimen, a cylindrical piece of aluminum stock, was held at three different distances from the radar detector 14. A CNC tool insert was tapped against the bottom surface of the test specimen to induce AE events in the test specimen, and the resulting sensor signal was recorded. The basic experiment was repeated five times at each of three distances, for a total of fifteen experimental trials.

For final measurements, the test specimen was strapped to a pine board (3"×½"×48") to help stabilize the test specimen and reduce distance variations. The sensor signals measured for the two test configurations were similar.

An accelerometer was attached to the top surface of the test specimen opposite from the tapped surface. Since prior research studies show that an accelerometer can detect acoustic emission in a metal object, the investigator used the accelerometer to verify that the method of the present invention using the Doppler radar detector 14 and the band-pass filter 12 could also detect AE in the test specimen. The given accelerometer has a frequency range from 1-7000 Hz with a resonance at 38 kHz (PCB Piezotronics, 1999).

Table 1 shows the experiment design for the 3 planned experimental (distance) conditions. The order of the trials was randomized. Table 2 shows properties of the aluminum stock specimen used for all tests. The inventor used the given specimen material because manufacturers often use Aluminum 6061 for prototyping machined parts. Table 3 shows properties of the CNC tool insert used to tap the aluminum test specimen.

TABLE 1

Experiment design for Experiment 1

| Trial | Sensor Distance (feet) |
|---|---|
| 1 | 0.5 |
| 2 | 1.0 |
| 3 | 1.5 |
| 4 | 0.5 |
| 5 | 1.0 |
| 6 | 1.5 |
| 7 | 0.5 |
| 8 | 0.5 |
| 9 | 1.0 |
| 10 | 1.5 |
| 11 | 1.0 |
| 12 | 1.0 |
| 13 | 1.5 |
| 14 | 0.5 |
| 15 | 1.5 |

TABLE 2

Test specimen properties

| | |
|---|---|
| Manufacturer | Alcoa |
| Material | Aluminum 6061 |
| Diameter | 1.5 in |
| Length | 5.25 in |
| Density | 0.098 lb/in$^3$ |
| Specific gravity | 1090 |
| Modulus of elasticity tension | 10 |
| Modulus of elasticity torsion | 3.8 |
| Chemistry | |
| Aluminum | balanced |
| Chromium | 0.04-0.35 |
| Copper | 0.15-0.4 |
| Iron | 0-0.7 |
| Magnesium | 0.8-1.2 |
| Manganese | 0.15 max |
| Other | 0.15 max |
| Remainder Each | 0.05 max |
| Silicon | 0.4-0.8 |
| Titanium | 0.15 max |

TABLE 3

Tool properties

| | |
|---|---|
| Manufacturer | Mitsubishi |
| Body material | tungsten carbide |
| Coating material (3 layers) | TiCN, A1203, TIN |
| Tool symbol | CNMA 432 |
| Tool geometry | |
| Shape | rhombic 80 deg |
| Clearance angle | 0 deg |
| Tolerance | M class (±0.003) |
| Chip breaker | none |
| Inscribed circle size | ½ inch |
| Thickness | 3/16 inch |
| Nose size | 1/32 inch |

An Omega DaqP-308 data collection system well known in the art and serving as the data collection and analysis 36 was used to sample the output signal from the combination of the Doppler radar detector 14 and the band-pass filter 12.

For each trial, the output signals from the Doppler radar detector 14 and the band-pass filter 12 as well as the accelerometer were measured for 0.2 seconds, during which the test specimen was tapped once with the CNC tool insert. A 0.1 msec sampling period (10 kHz sampling frequency) was used. As a result, according to the Nyquist Sampling Theorem, the sampled data can be used to reconstruct frequency components up to 5 kHz in the original signal (Swanson, 2000).

The Doppler radar detector 14 used was a model MDU 1620 Motion Detector Unit from Microwave Solutions (http://www.microwave-solutions.com). The MDU 1620, an X-band (10.525 GHz) microwave transmitter 16 and receiver 18, "senses" motion using the Doppler shift phenomenon. The MDU transmitter 16 emits a low-level X-band microwave signal over a 72 degree (horizontal) by 36 degree (vertical) coverage pattern. A radar signal 22 reflected from an object moving toward or away from the sensor increases or decreases in frequency, with respect to the original transmitted signal frequency. The MDU receiver 18 captures the radar reflection 24, compares the transmitted and received frequencies, and produces an IF output signal 26 with frequency proportional to the velocity of the moving object. IF output signal amplitude varies as a complex function of the size and reflectivity of the sensed object and the object's distance from the MDU. (Microwave Solutions, 2002).

However, the inventor showed that the MDU can be used for directly sensing acoustic emission in the 1-5 kHz frequency range rather than just object motion, as described by the MDU manufacturer.

To prevent aliasing during sampling, the band-pass filter 12 was used to band-limit the output signal 26 from the Doppler radar detector 14 before sampling. The electronic filter also effectively removed low-frequency signals due to large-scale object motions.

The electronic band-pass filter 12 uses a blocking capacitor 40 to isolate the detector 14 from the filter 12, an amplifier stage 42 to increase motion detector output signal level, two fourth-order high-pass filter stages 44 to eliminate low-frequency signals due to mechanical object motion, one fourth-order low-pass filter stage 46 to band limit the signal 26 and to eliminate high-frequency noise, and a final amplifier stage 48 to match the output of the filter to the input range of the data collection system 36.

Figure 3:
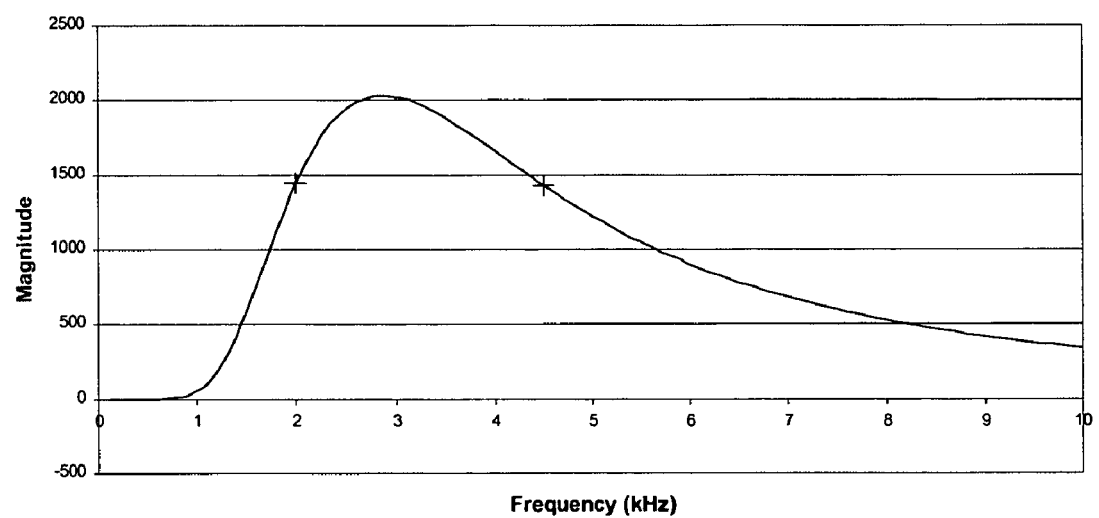
FIG. 3 illustrates a frequency response for the filter of FIG. 2.

FIG. 3 shows the theoretical frequency response of the filter 12. The cut-off frequency of each fourth-order high-pass filter 44 was 1.59 kHz, and the cut-off frequency of the fourth-order low-pass filter 46 was 3.39 kHz (Millman & Halkias, 1972). As a result, upper and lower cut-off frequencies for the complete filter 12 are approximately 2 kHz and 4.5 kHz respectively; as shown in FIG. 9, the magnitude of the filter frequency response is 3 dB down from the maximum gain value at approximately 2 kHz and 4.5 kHz. To meet the Nyquist Theorem sampling criterion, Swanson (2000) recommends using a band-limiter filter with an upper-cut off frequency which is roughly 0.4 times the sampling frequency. Since the fourth-order low pass filter 46 which was used has a sharp drop-off characteristic with increasing frequency, to maximize the detection range, an upper cut-off frequency of 4.5 kHz was used.

Preliminary measurements indicated that the accelerometer signal was naturally band-limited to less than 5 kHz. However, a simple single-order passive RC low-pass filter with a cut-off frequency of 4 kHz was used to filter the accelerometer output signal before sampling.

Several prior studies have used piezoelectric, piezoceramic, or capacitive sensors, or laser interferometry, to detect high-frequency acoustic emission events in the 100 kHz-1 MHz range (Barton & Reuben, 1996; Govekar et al., 2000; McBride et al., 1993). However, since the signals for Experiment 1 appeared to lie in the 1-5 kHz range, a 10 kHz sampling rate was used. Experiments also show the sensor, combined with a higher-frequency band-pass filter, can detect acoustic emission events at frequencies up to 125 kHz.

The captured data was analyzed using MathSoft MathCAD 2000i, Microsoft Excel 2002, and SAS JMP 5.

Experiment 2

For Experiment 2, the same test setup and experimental design was used. However, for Experiment 2, a pencil lead was broken against the bottom surface of the test specimen to create an acoustic emission even.

Several prior AE research studies have used pencil lead break tests (Spedding, 1996; Schoes and Zook, 1999; Brown et al., 1999). As a result, in 1998, the American Society for Testing and Materials (ASTM) established a standard method (E97-94) for conducting pencil lead break tests for acoustic emission sensors (ASTM, 1998). ASTM E 974-94 recommends using a mechanical pencil with a 0.3 or 0.5 mm diameter lead. According to the standard, care should be taken to always break the same length (2-3 mm) of the same type of lead. In addition, the lead should be broken at the same spot on the test specimen, using the same pencil angle and orientation. The standard also describes an optional fixture (Nielson show), which can be used to help control pencil angle and lead length.

For the given experiment, a mechanical pencil with a 0.7 mm lead was used (to increase sensor output signal levels). Approximately 3 mm of pencil lead was broken at approximately the center of the bottom face of the cylindrical test specimen. The pencil was held at an approximately 45 degree angle with respect to the bottom surface of the test specimen. Table 4 shows the experimental design for Experiment 2. The order of the trials was again randomized.

TABLE 4

Experiment design for Experiment 2

| Trial | Sensor Distance (feet) |
|---|---|
| 1 | 0.5 |
| 2 | 1.5 |
| 3 | 0.5 |
| 4 | 1.0 |
| 5 | 1.0 |
| 6 | 0.5 |
| 7 | 1.5 |
| 8 | 0.5 |
| 9 | 0.5 |
| 10 | 1.5 |
| 11 | 1.0 |
| 12 | 1.5 |
| 13 | 1.0 |
| 14 | 1.5 |
| 15 | 1.0 |

Experiment 1 Results

Figure 4:
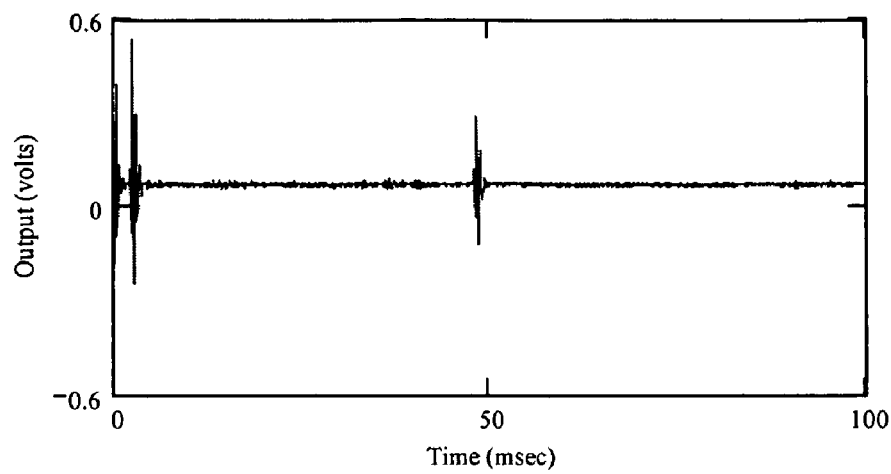
FIG. 4 illustrates a radar detector output signal from Experiment 1 of the preferred embodiment of the method of the present invention
Figure 4:
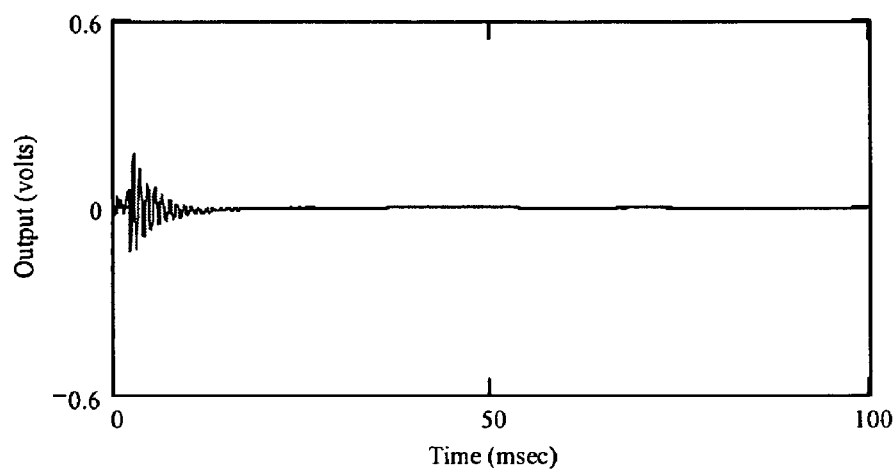

FIG. 4 shows representative signals generated by the microwave Doppler radar detector 14 and the accelerometer in response to acoustic emission events created by tapping a CNC machine tool insert against a cylindrical aluminum test specimen.

Figure 5:
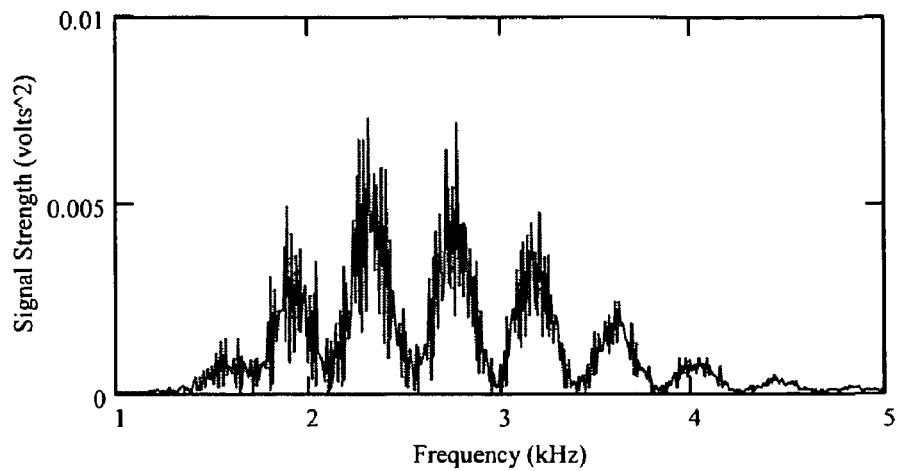
FIG. 5 illustrates an accelerometer output signal from Experiment 1 of the preferred embodiment of the method of the present invention.
Figure 5:
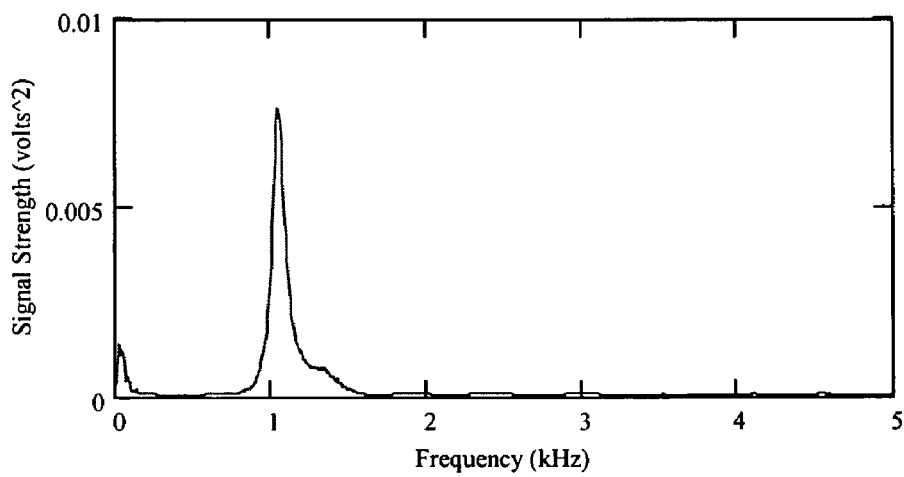

FIG. 5 shows corresponding power spectra for the signals shown in FIG. 4. The power spectra was computed using MathCAD fft function. While the accelerometer appears to ring at a given frequency, the microwave radar detector 12 and band-pass filter 14 tend to give a more broad-band response, which may more accurately reflect actual characteristics of the AE event.

As seen in FIG. 4, the Doppler radar detector 14 and band-pass filter 12 detects a secondary AE event, which may be the reflected acoustic wave. If the secondary acoustic emission event is the reflected acoustic wave, then the Doppler radar detector 14 may detect small-scale surface vibrations caused by both the initial tool contact and the reflected acoustic wave. The accelerometer absorbs incident acoustic waves and, therefore, apparently does not detect any significant reflected waves.

Experiment 1 shows that both types of sensors detect acoustic emission events generated by tapping a CNC machine tool insert against an aluminum test specimen. At the given distance of 0.5 feet, output signal level from the microwave Doppler radar detector 14 band-pass filter 12 is roughly three times that of the accelerometer sensor. However, statistical analysis of the data from all fifteen Experiment 1 trials shows that the microwave Doppler radar detector 14 output varies with distance form the tapped test specimen.

As seen in Table 5, regression analysis of the data from all fifteen Experiment 1 trials shows evidence of a statistically significant relationship between the natural logarithm of sensor peak-to-peak output voltage and distance between the microwave Doppler radar detector 14 and the test specimen; as distance between the microwave Doppler radar detector 14 and the test specimen increases, the natural logarithm of predicted sensor output voltage decreases as a function of distance and distance squared, for test distances between 0.5 and 1.5 feet: $\ln(\text{predicted peak-to-peak voltage}) = 0.902 - 2.989 \cdot \text{distance} + 3.177 \cdot (\text{distance}-1)^2$ (1).

TABLE 5

Sensor peak-to-peak voltage for Experiment 1

| Trial | Distance (feet) | Accelerometer (volts) | Radar (volts) |
|---|---|---|---|
| 1 | 0.5 | 0.603 | 1.287 |
| 2 | 1.0 | 1.251 | 0.118 |
| 3 | 1.5 | 0.429 | 0.120 |
| 4 | 0.5 | 0.448 | 3.665 |
| 5 | 1.0 | 0.295 | 0.228 |
| 6 | 1.5 | 1.201 | 0.039 |
| 7 | 0.5 | 0.311 | 0.776 |
| 8 | 0.5 | 2.268 | 2.036 |
| 9 | 1.0 | 1.242 | 0.110 |
| 10 | 1.5 | 1.224 | 0.060 |
| 11 | 1.0 | 0.357 | 0.128 |
| 12 | 1.0 | 0.680 | 0.123 |
| 13 | 1.5 | 0.318 | 0.052 |
| 14 | 0.5 | 0.397 | 0.579 |
| 15 | 1.5 | 1.197 | 0.097 |

For the model $R^2 = 0.88$ and the p-value<0.0001 ($\alpha = 0.05$). The natural logarithm of sensor peak-to-peak output voltage was analyzed to meet the conditions required for regression analysis.

The corresponding relationship between predicted sensor peak-to-peak voltage and distance shows that predicted sensor output voltage decreases exponentially as a function of distance and distance squared, for test distances between 0.5 and 1.05 feet: $\text{predicted peak-to-peak voltage} = \exp\{4.169 - 9.343 \cdot \text{distance} + 3.177 \cdot \text{distance}^2\}$ (2).

The results show that the given microwave Doppler radar detector 14 and band-pass filter 12 with appropriate band-pass filtering can be used to detect acoustic emission events in machine tool-monitoring applications, at sensor distances up to approximately 1.5 feet.

Microwave radar sensor output voltage values shown in Table 5 appear to vary more than accelerometer sensor values. Using the preferred embodiment band-pass filter 12 with a narrow band-pass and high gain value with the Doppler radar detector 14 probably caused the increased variability. Acoustic emission signals tend to be broadband. However, the given microwave radar sensor strongly attenuates any signal content outside the 1-5 kHz range and strongly amplifies any signal content within the 1-5 kHz range. Thus the given method of using the Doppler radar detector 14 and the band-pass filter 12 converts any differences in signal frequency content, for different experimental trials, into relatively large differences in signal output voltage. On the other hand, the acoustic emission events all appear to make the piezoelectric crystal in the accelerometer sensor oscillate at a single frequency.

Experiment 2 Results

Figure 6:
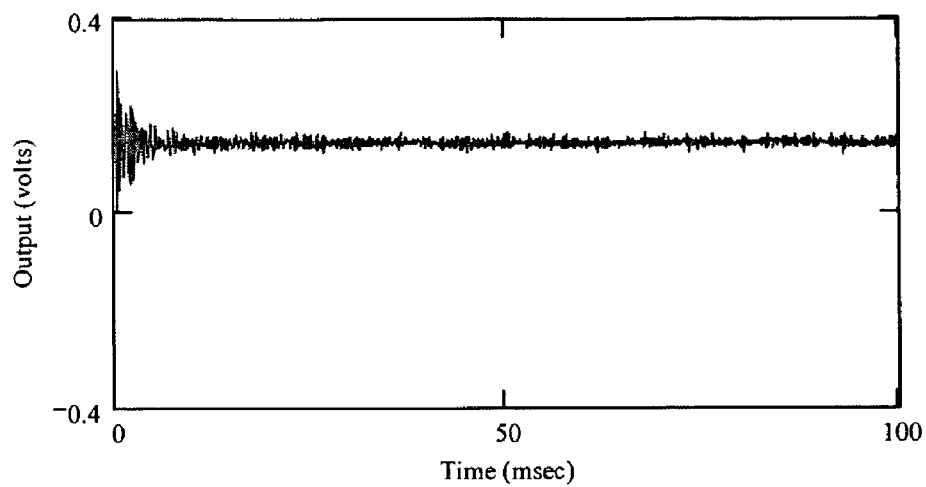
FIG. 6 illustrates a radar detector output signal from Experiment 2 of the preferred embodiment of the method of the present invention
Figure 6:
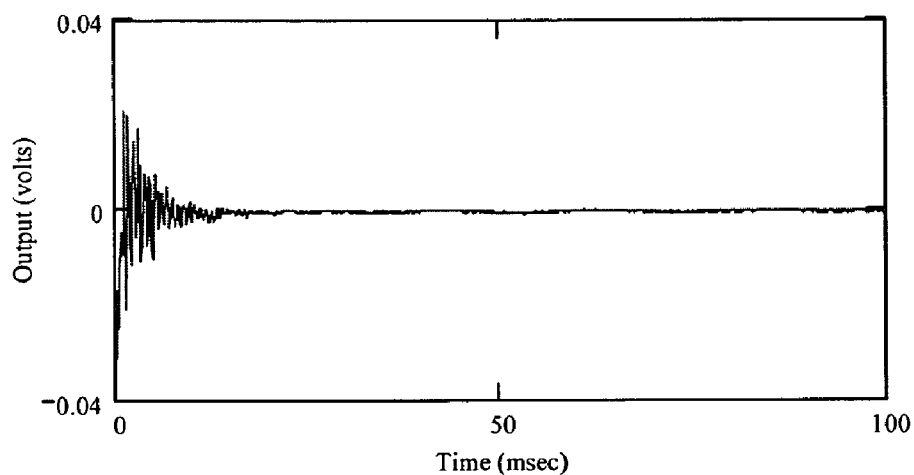
Figure 7:
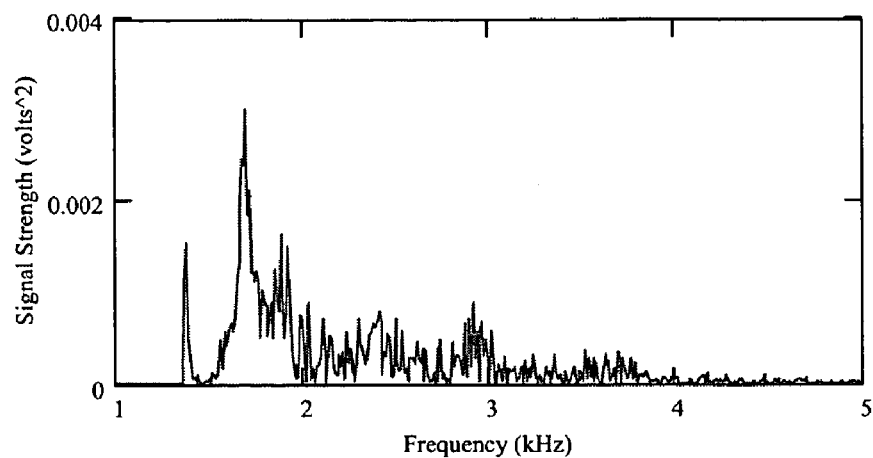
FIG. 7 illustrates an accelerometer output signal from Experiment 2 of the preferred embodiment of the method of the present invention.
Figure 7:
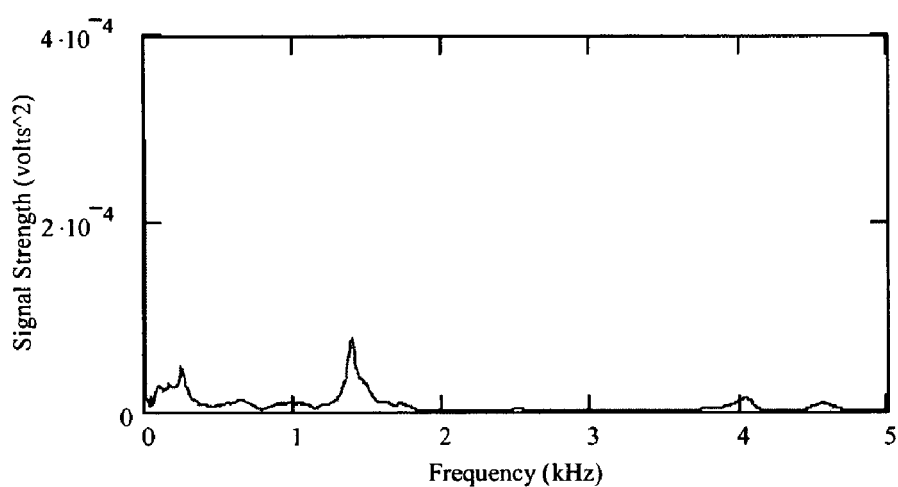

FIG. 6 shows representative signals generated by microwave Doppler radar detector 14 and the accelerometer in response to acoustic emission events created by breaking a 0.7 mm mechanical pencil lead on the bottom surface of the test specimen. FIG. 7 shows corresponding power spectra for the signals shown in FIG. 6. Note that, at the given distance of 0.5 feet, output signal level from the microwave Doppler radar detector 14 is roughly ten times that of the accelerometer sensor. As a result, FIGS. 6 and 7 use different scales. These figures show that the two sensors apparently both detect acoustic emission events generated by breaking a 0.7 mm pencil lead on an aluminum test specimen.

Regression analysis of the data from all fifteen Experiment 2 trials, shown in Table 6, shows evidence of a statistically significant relationship between the natural logarithm of sensor peak-to-peak output voltage and distance between the microwave Doppler radar detector 14 and the test specimen; as distance between the microwave Doppler radar detector 14 and the test specimen increases, the natural logarithm of predicted sensor output voltage decreases as a function of distance. For test distances between 0.5 and 1.5 feet: $\ln(\text{predicted peak-to-peak voltage}) = -1.233 - 0.936 \cdot \text{distance}$ (3).

For the model, $R^2 = 0.28$ and the p-value=0.043 ($\alpha = 0.05$). Once again, the natural logarithm of sensor peak-to-peak output voltage was analyzed to meet the conditions required for regression analysis.

TABLE 6

Sensor peak-to-peak voltage for Experiment 2

| Trial | Distance (feet) | Accelerometer (volts) | Radar (volts) |
|---|---|---|---|
| 1 | 0.5 | 0.065 | 0.159 |
| 2 | 1.5 | 0.057 | 0.192 |
| 3 | 0.5 | 0.058 | 0.072 |
| 4 | 1 | 0.067 | 0.054 |
| 5 | 1 | 0.068 | 0.139 |
| 6 | 0.5 | 0.052 | 0.288 |
| 7 | 1.5 | 0.062 | 0.087 |
| 8 | 0.5 | 0.056 | 0.727 |
| 9 | 0.5 | 0.047 | 0.113 |
| 10 | 1.5 | 0.136 | 0.045 |
| 11 | 1 | 0.049 | 0.076 |
| 12 | 1.5 | 0.075 | 0.074 |
| 13 | 1 | 0.051 | 0.180 |
| 14 | 1.5 | 0.073 | 0.046 |
| 15 | 1 | 0.053 | 0.105 |

The corresponding relationship between predicted sensor peak-to-peak voltage and distance shows that predicted sensor output voltage decreases exponentially as a function of distance, for test distances between 0.5 and 1.5 feet: $\text{predicted peak-to-peak voltage} = \exp\{-1.233 - 0.936 \cdot \text{distance}\}$ (4).

The results show that the given microwave Doppler radar detector 14 and band-pass filter 12 with appropriate band-pass filtering can be used to detect acoustic emission events in a wide variety of applications, at sensor distances up to approximately 1.5 feet.

The new AE detection method of the present invention can be used for tool condition monitoring in machining operations. In addition, other applications and uses may benefit by using the newly developed method and sensor.

Many modifications and variations of the present invention are possible in light of the above teachings. The present invention contemplates use in higher frequency ranges, for detection of AE in different materials, for detection of AE generated from different noise sources, and the use of Doppler radar detectors for detecting tool condition and other machine conditions in numerous types of machining and other applications. Thus, the present invention has been described in an illustrative manner. It is to be understood that the terminology that has been used is intended to be in the nature of words of description rather than of limitation.

For example, the distance between the Doppler radar detector 14 and the test specimen is only limited by currently available and inexpensive motion detection units, and with higher quality higher output units, greater distances are envisioned. Therefore, within the scope of the appended claims, the present invention may be practiced otherwise than as specifically described.

What I claim is:

1. A method of determining information about an area comprising the steps of:
    flooding an area with a transmitted microwave radar signal;
    receiving reflected radar signal from the flooded area;
    generating an intermediate frequency signal based on differences between said microwave radar signal and said reflected radar signal;
    filtering said intermediate frequency signal to isolate signals associated with acoustic emissions, remove low-frequency signals of less than approximately 1 kHz associated with mechanical motion;
    measuring the filtered intermediate frequency signal;
    wherein said method further includes determining a characteristic associated with said area at least partially based on said filtered intermediate frequency signal;
    wherein said area includes at least one object that is dielectric or metallic, said reflected radar reflections are reflected off of said at least one object, and said characteristic is associated with said at least one object; and
    wherein said at least one object is a tool and said characteristic is wear of said tool.

2. The method of claim 1, wherein said tool is a lathe.

3. A method of determining information about an area comprising the steps of:
    flooding an area with a transmitted microwave radar signal;
    receiving reflected radar signal from the flooded area;
    generating an intermediate frequency signal based on differences between said transmitted microwave radar signal and said reflected radar signal;
    filtering said intermediate frequency signal to isolate signals associated with acoustic emissions, remove low-frequency signals of less than 1 kHz associated with mechanical motion; and remove high-frequency signals sufficient to prevent aliasing;
    measuring the filtered intermediate frequency signal;
    determining a characteristic associated with said area at least partially based on said filtered intermediate frequency signal; and
    establishing a relationship between said characteristic and said filtered intermediate frequency signal to allow prediction of said characteristic based upon said filtered intermediate frequency signal.

4. The method of claim 3, wherein a Doppler radar detector houses a microwave transmitter that generates said transmitted microwave signal, houses a microwave receiver that receives said radar reflections, and provides said intermediate frequency signal.

5. The method of claim 3, wherein a band-pass filter performs said filtering.

6. The method of claim 3, wherein said characteristic is based on the amplitude of said reflected radar signal.

7. The method of claim 3, wherein said characteristic is based on the frequency of said reflected radar signal.

8. The method of claim 3, wherein said relationship is a regression relationship.

9. The method of claim 3 wherein said area includes at least one object that is dielectric or metallic, said reflected radar reflections are reflected off of said at least one object, and said characteristic is associated with said at least one object.

10. The method of claim 9, wherein said at least one object is a tool and said characteristic is wear of said tool.

11. The method of claim 10, wherein said tool is a lathe and tool wear is predicted during operation of said lathe.

* * * * *